June 25, 1963  R. A. RENOUX  3,094,744
METHOD AND MEANS FOR STAMPING GRAMOPHONE RECORDS
Filed Oct. 28, 1958
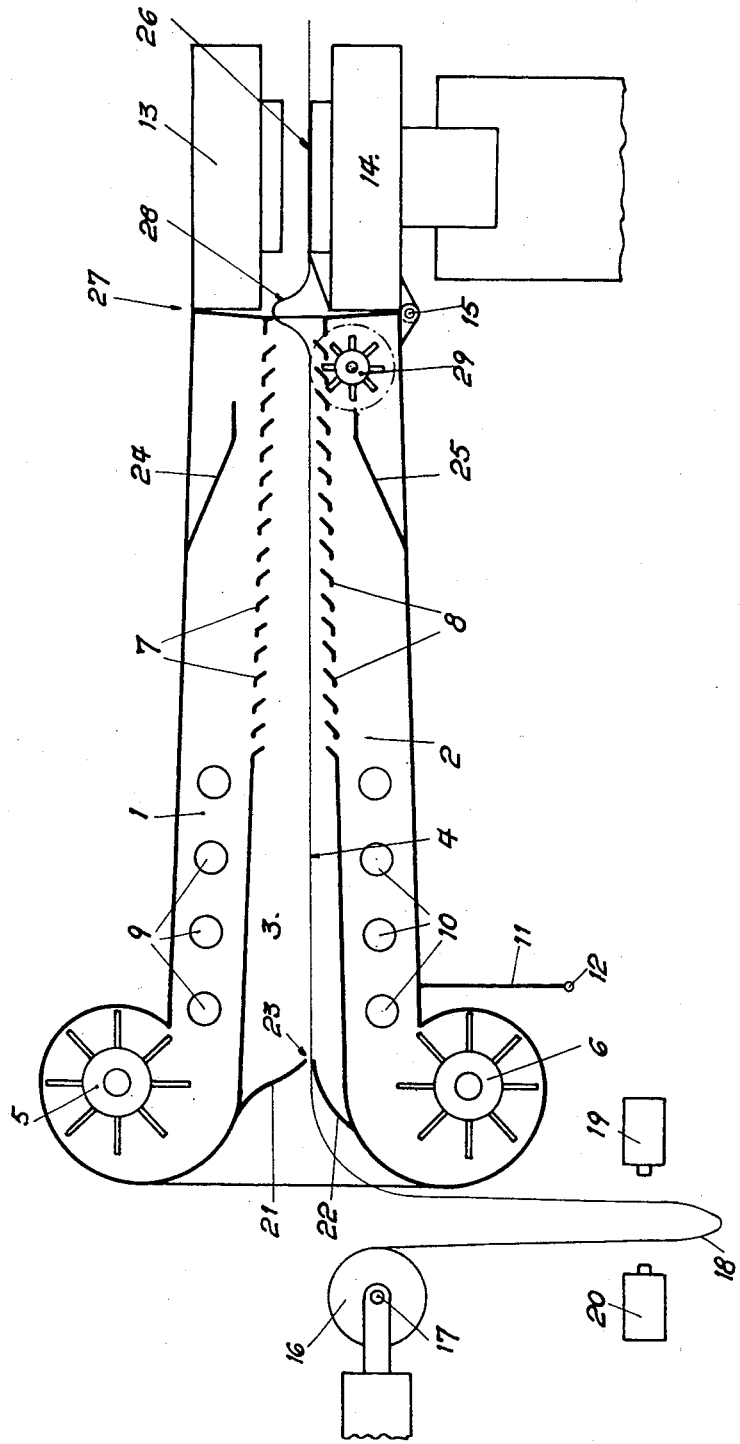

United States Patent Office 3,094,744
Patented June 25, 1963

3,094,744
METHOD AND MEANS FOR STAMPING
GRAMOPHONE RECORDS
Robert Albert Renoux, Paris, France, assignor to Societe
d'Applications Industrielles Plastiques, Sartrouville,
Seine-et-Oise, France, a company of France
Filed Oct. 28, 1958, Ser. No. 770,215
7 Claims. (Cl. 18—19)

The present invention has for its object an arrangement for conditioning and conveying films of plastic material and chiefly, but not exclusively, films of this type, the thickness of which is very small, say of a magnitude of 20 to 100 microns. Films of such a reduced thickness require the solving of particular problems, chiefly by reason of the easy modification in the local temperature of their different parts when they are in contact with a material having a higher specific heat or a different temperature. This leads inside the film to substantial inner strains which produce blisters or folds which are detrimental to the subsequent operation of the film through shaping or through compression.

The present invention has for its object a method which allows cutting out reliably said drawback, said method consisting chiefly in resorting to a stream of air for conveying and/or conditioning films of plastic material.

According to a preferred embodiment of said method, a stream of conditioned air is caused to flow over a film which is not subjected to any tensioning, said stream acting on a free loop of the film.

The invention has also for its object an arrangement for the execution of the method which has just been described, said arrangement including chiefly: a tunnel for the conveying and conditioning of the film, means for producing inside said tunnel a suitably directed conditioning and conveying stream and means for feeding the film in an unstrained condition into the tunnel.

It is of advantage to associate such a conditioning and conveying arrangement with a film-transforming machine, the stream of air being then directed towards said transforming machine so that the latter may be fed without any positive contact between the film and any mechanical means.

Further features of the invention will appear in the reading of the following description, reference being made to the accompanying drawings given by way of example and by no means in a limiting sense, the single FIGURE of said drawing illustrating diagrammatically in elevational view an improved arrangement according to the invention.

Said arrangement is constituted by a tunnel which includes two sheaths 1 and 2 defining between them a channel 3 through which the film of plastic material 4 is to be fed; said channel is obviously closed by two sidewalls which may be suitably heat-insulated.

Two fans 5 and 6 allow sending into said sheaths 1 and 2, respectively, streams of air which thenafter impinge against the opposite sides of the film onto which they are guided by flaps or deflectors, as shown at 7 and 8, formed along openings in the inner walls of the sheaths. Said air is heated as it passes out of the fans by heating elements such as 9 and 10 which may be of any desired type such as an electrical resistance, a stream-carrying pipe and the like.

It is of advantage to make the tunnel rest on a strut 11 carried by a small wheel 12 for a purpose to be specified hereinafter.

In the embodiment illustrated, the tunnel is associated with a pressing machine 13 which is intended to give the desired shape to the film 4. The tunnel is then pivotally secured to the movable section or piston 14 of said machine through a conventional hinge 15. The film to be treated 4 is wound off a roller 16 mounted on an unwinding spindle 17, the unwinding being preferably controlled mechanically, say by a motor the speed of which may be controlled by the photo-cell referred to hereinafter. The film forms a downwardly extending loop 18 which registers with the gap between a source of light 19 and a photo-cell 20, which latter controls means for stepping and starting the unwinding of the film off the roller 16.

Yielding flaps 21 and 22 are advantageously provided at the input end of the tunnel, so as to define a narrow input gap 23 for the film 4 and to avoid thereby any loss of heat. Further flaps 24 and 25 form deflectors which direct at the end of their travel the stream of hot air towards the above-mentioned deflectors 7 and 8, with a view to allowing the maintenance and/or adjustment of the pressure of air inside the channel 3.

The arrangement described operates as follows: the film is first introduced into the channel 3, after which the heating means 9 and 10 are started operating. Care is taken to unwind a length of film which is sufficient for the formation of the loop 18 ahead of its input into the tunnel, said loop being long enough for cutting off the luminous beam between the source 19 and the photo-cell 20.

Inside the tunnel, the film is held floatingly in position by the stream of hot air escaping from the sheaths 1 and 2 and which is guided towards the corresponding surfaces of the film by the deflectors 7 and 8. The film is thus held inside the tunnel and axially thereof, without touching the walls of the latter, so that it assumes immediately the temperature prevailing in the central channel 3. The film is furthermore subjected to a balanced pressure, since the two streams engage its opposite surfaces, being fed thereto through the cooperating upper and lower deflectors 7 and 8. The temperature of the film being perfectly constant throughout its surface, this cuts out the possibility of any straining of the film and returns into their original condition the molecules of plastic material which are more or less set along preferential directions by the calendering or rolling applied during the manufacture of the film.

It has been assumed in the drawing that the press 13 has just finished operating, the lower piston 14 being in its lowermost position. A fraction 26 of the film is fed longitudinally between the die and the counter-die of the press by the streams of hot air escaping outwardly between said two parts. At this moment, the piston 14 rises and, as a consequence of the pivotal connection between it and the tunnel, the latter assumes a sloping position with reference to horizontality as allowed by the presence of the struts 11 and, consequently, there is formed a gap 27 between the upper stationary section 13 of the pressing machine and the front end of the tunnel. The film being now now held fast between the die and the counter-die, the stream of hot air will escape through said gap 27, which urges the film section registering with said gap to rise and to form a loop at 28.

When the operation of the press is at an end, the piston 14 sinks and rocks the tunnel in the opposite direction so as to close the gap 27. The stream of hot air escapes again as precedingly through the press and this results in flattening the film section which has formed the loop 28 and urging it into the space between the die and the counter-die of the press.

It is thus found that the arrangement disclosed allows conveying the film 4 at a constant speed inside the tunnel and this provides for a conditioning or treatment of the film under excellent conditions, although it is fed into a machine operating intermittently.

The arrangement described includes of course the different adjusting means which may appear as necessary. It is possible for instance to provide a turbine such as 29 fed with a stream of air by the above-mentioned deflector 25 facing its blades and thus the turbine may drive a roller adapted to guide the film towards the utilization apparatus. It is also possible to resort to temperature regulators such as means operatively connected with the turbine 29, with a view to adjusting the speed of the fans 5 and 6 and thereby adjusting simultaneously the volume and the speed of the stream of air.

Lastly, it is of advantage to connect the sheaths 1 and 2 through yielding vertical walls, the spacing of which may be thus adjusted together with the pressure of the stream of air.

A further adjustment is obtained by the photocell 20 which provides for acceleration of the progression of the film when the loop 18 becomes too small and no longer cuts off the luminous beam fed by the source of light 19.

The embodiments of the invention which have just been described have been given obviously by way of a mere exemplification and many modifications may be brought thereto without unduly widening the scope of the invention as defined in the accompanying claims.

What I claim is:

1. In an arrangement for conditioning, conveying and pressing thin plastic film, comprising a supply reel of film off which the film is adapted to unwind, a press, a tunnel having a substantially horizontal rest position and respectively an input end near said supply reel and an output end near said press, means pivotally mounting said tunnel about a transverse axis, means whereby the pivotal movement of said tunnel effects the opening of a clearance space at the output end of the tunnel juxtaposed to said press, fan means streaming air through said tunnel for feeding the film through said tunnel to said press, means for conditioning and heating said air for bringing said film just prior to its entry into the press to a temperature adapted for pressing, means synchronized with the operation of said press for repeatedly rotating said tunnel about said axis for opening said clearance space whereby to direct outwardly of said clearance space said air stream to form an inverted loop in said film juxtaposed to the feed side of said press, and thereafter rotating said tunnel to close said clearance space whereby to direct the air stream to effect the collapse of the said inverted loop and the consequent feeding of said film rapidly into said press.

2. A method of feeding thin continuous plastic film to a stamping press for the forming of gramophone records from said film that comprises forming and maintaining a vertical loop of film to compensate for irregular feeding of the film, moving the film in a substantially horizontal path between the vertical loop and stamping mechanism by directing blasts of air against the film in such relation as to support the film substantially without physical supports, and so controlling and directing said blasts of air in timed relation to the operation of the stamping mechanism that each operation of the stamping mechanism is accompanied by the forming of an inverted loop by the air and a collapse of said loop to feed the plastic film effectively into said stamping mechanism.

3. A method of feeding thin continuous plastic film to a stamping press for the forming of gramophone records from said film that comprises forming and maintaining a first loop of film to compensate for the irregular feeding of the film into stamping mechanism, moving the film between the loop and the stamping mechanism by directing blasts of air to the film in such relation as to support the film substantially without physical supports, and so directing and timing the blasts of air whereby to form a second inverted loop in said film at said stamping mechanism during each operation of said stamping mechanism.

4. A method of feeding thin continuous plastic film to a stamping press for the forming of gramophone records from said film that comprises forming and maintaining a loop of film to compensate for irregular feeding of the film to stamping mechanism, moving the film between the loop and the stamping mechanism by directing blasts of air to the film in such relation as to support the film substantially without physical supports, and controlling and directing the air substantially at the stamping mechanism in timed relation to the stamping mechanism to create by the directed and timed movement of part of the air an upwardly extending inverted loop in said film in a position to effect rapid entry of film into the stamping mechanism when the inverted loop is eliminated, and then redirecting the air to permit the elimination of the inverted loop and the consequent feeding of the film rapidly into the stamping press.

5. A method of feeding thin continuous film to a stamping press for the forming of gramophone records from said film that comprises moving a length of plastic film substantially horizontally a short distance just prior to its entering the stamping mechanism by directing blasts of air against the film in such relation as to support the film substantially without physical supports and to condition the film, and controlling the air blasts at the stamping mechanism in timed relation to the stamping mechanism through the directed and timed movement of a part of the air, whereby to form repeatedly during each cycle of operation of the press an upwardly extending inverted loop in said film in a position to effect rapid entry of the film into the stamping mechanism when the inverted loop is eliminated, and then redirecting the air during each operation of the stamping mechanism to effect the collapse of the loop and the consequent projection of the film by gravity rapidly into the stamping press as a result of the collapsing of the loop.

6. In a combination of the class described utilizing a wound roll of thin plastic film, a tunnel, a stamping mechanism at one end of the tunnel, means generating and directing blasts of air through said tunnel, means guiding the said air obliquely towards a medial plane of said tunnel to urge forwardly the film entering the tunnel along said plane, said air being at a temperature to condition said film for effective action by said stamping mechanism at the end of the tunnel, and means actuated in timed relation to the operation of the stamping mechanism to control the direction of the air at the end of the tunnel during each operation of the stamping mechanism first to form an inverted loop in said plastic film by directing the air pressure during each cycle of operation of the press upwardly against the film, and then effecting the collapse of said loop during each cycle of operation just as the press opens by directing the air pressure substantially longitudinally of the tunnel, whereby to project the film into said stamping mechanism through utilizing the gravity movement of the film of said collapsing loop.

7. A method of feeding continuous thin plastic film to a stamping press including the step of directing a blast of air against the underside of the film to form an inverted loop in the film juxtaposed to the feed side of the press just prior to each opening of the press for receiving the film, and then permitting said loop to collapse by thereafter directing the air blast from under the loop of film and toward the press each time the press opens and while said film is free to move from said loop only in the direction of the press, whereupon the resulting collapse of the loop each time the press opens will effect the immediate projection of the film of the loop into the press utilizing the gravity movement of the collapsing loop.

References Cited in the file of this patent

UNITED STATES PATENTS

| | | |
|---|---|---|
| 378,266 | Simonds | Feb. 21, 1888 |
| 1,556,057 | Wheller | Oct. 6, 1925 |
| 1,847,915 | Bailey | Mar. 1, 1932 |
| 1,904,268 | Bronson | Apr. 18, 1933 |
| 1,933,336 | Peterman | Oct. 31, 1933 |
| 2,037,806 | Little | Apr. 21, 1936 |

(Other references on following page)

UNITED STATES PATENTS

| | | | | | | |
|---|---|---|---|---|---|---|
| 2,219,682 | Doble | Oct. 29, 1940 | | 2,480,781 | Simpson | Aug. 30, 1949 |
| 2,261,971 | Mathews | Nov. 11, 1941 | | 2,521,387 | Maynard et al. | Sept. 5, 1950 |
| 2,295,327 | Bendz | Sept. 8, 1942 | | 2,848,820 | Wallin et al. | Aug. 26, 1958 |
| 2,337,581 | Wiley | Dec. 28, 1943 | | 2,891,280 | Politis | June 23, 1959 |
| 2,393,015 | Bendz | Jan. 15, 1946 | | 2,968,982 | Cousino | Jan. 24, 1961 |